United States Patent
Ehegartner

(12) 
(10) Patent No.: US 11,549,645 B2
(45) Date of Patent: Jan. 10, 2023

(54) CRYOGENIC VESSEL

(71) Applicant: Linde GmbH, Pullach (DE)

(72) Inventor: Florian Ehegartner, Neuötting (DE)

(73) Assignee: Linde GmbH, Munich (DE)

( * ) Notice: Subject to any disclaimer, the term of this patent is extended or adjusted under 35 U.S.C. 154(b) by 42 days.

(21) Appl. No.: 16/960,652

(22) PCT Filed: Jan. 17, 2019

(86) PCT No.: PCT/EP2019/025015
§ 371 (c)(1),
(2) Date: Jul. 8, 2020

(87) PCT Pub. No.: WO2019/141510
PCT Pub. Date: Jul. 25, 2019

(65) Prior Publication Data
US 2020/0332959 A1 Oct. 22, 2020

(30) Foreign Application Priority Data
Jan. 19, 2018 (EP) .................................... 18020029

(51) Int. Cl.
*F17C 13/00* (2006.01)
*F17C 1/14* (2006.01)

(52) U.S. Cl.
CPC .............. *F17C 1/14* (2013.01); *F17C 13/001* (2013.01); *F17C 2203/0629* (2013.01); *F17C 2223/0161* (2013.01); *F17C 2223/033* (2013.01)

(58) Field of Classification Search
CPC ...... F17C 2223/0161; F17C 2205/0352; F17C 2203/0629; F17C 1/14; F17C 13/001;
(Continued)

(56) References Cited

U.S. PATENT DOCUMENTS 1,953,467 A   4/1934  Dana
2,018,144 A * 10/1935  Mesinger ................. F04B 7/04
                                                   62/45.1
(Continued)

FOREIGN PATENT DOCUMENTS

DE          592298 C     2/1934
DE       202 05 808 U1   6/2002
GB          412 814 A    7/1934

OTHER PUBLICATIONS

International Search Report of the International Searching Authority for PCT/EP2019/025015 dated Apr. 11, 2019.
(Continued)

*Primary Examiner* — Stephen J Castellano
(74) *Attorney, Agent, or Firm* — Millen White Zelano & Branigan, PC; Brion P. Heaney

(57) ABSTRACT

The present invention relates to a cryogenic vessel (300a, 300b) having an inner container (301), an outer container (302), an intermediate space (303) between the inner container (301) and the outer container (302) which can be evacuated, and having at least one fluid distribution container (200), which has an internal volume which extends proceeding from one wall of the inner container (301) into the intermediate space (303), is arranged at least partially within the intermediate space (303) and is fluidically connected to the inner container (301), wherein the internal volume of the fluid distribution container (200) is delimited by a wall which has openings (211, 212, 213) that are designed for the connection of one line (311, 312, 313) each or are each connected with one such line (311, 312, 313). The wall (121, 221) has a convex section (101, 201), wherein a wall thickness of the wall at at least one point is less than 90% of a wall thickness of the inner container (301). The invention also relates to a fluid distribution
(Continued)

container (100, 200) and to a method for producing a cryogenic vessel (300*a*, 300*b*).

19 Claims, 4 Drawing Sheets

(58) Field of Classification Search
CPC ............ F17C 13/086; F17C 2203/0631; F17C 2205/0149; F17C 2201/0109; F17C 2201/0128; F17C 2201/0152
See application file for complete search history.

(56) References Cited

U.S. PATENT DOCUMENTS

| | | | | |
|---|---|---|---|---|
| 2,871,669 | A | * | 2/1959 | Mann ........................ F17C 3/10 |
| | | | | 62/157 |
| 3,122,000 | A | | 2/1964 | Sirocky |
| 5,165,246 | A | | 11/1992 | Cipolla et al. |
| 2013/0087567 | A1 | * | 4/2013 | Kaneko ..................... F17C 1/06 |
| | | | | 242/430 |
| 2013/0313341 | A1 | | 11/2013 | Bauver, II et al. |
| 2016/0068235 | A1 | * | 3/2016 | Ohtsuka .................. F17C 13/00 |
| | | | | 114/73 |
| 2016/0137056 | A1 | * | 5/2016 | Komiya .................... F17C 1/00 |
| | | | | 220/581 |

OTHER PUBLICATIONS

English translation of International Search Report of the International Searching Authority for PCT/EP2019/025015 dated Apr. 11, 2019.

* cited by examiner

CRYOGENIC VESSEL

This application is the national stage (Rule 371) of international application No. PCT/EP2019/025015 filed Jan. 17, 2019.

The invention relates to a cryogenic vessel having an inner container and an outer container and an intermediate space, which can be evacuated, between the inner container and the outer container, and having at least one fluid distribution container for such a cryogenic vessel, and to a method for producing a corresponding cryogenic vessel.

PRIOR ART

Liquid gases are used in numerous fields of application, e.g., in metal processing, in medical technology and electronics, in water treatment and energy generation, and in the food industry. Today, industrial gases are increasingly being delivered to the customer in liquid form and stored on-site before they are further used.

Vacuum-insulated cryogenic vessels or cryogenic tanks are used for storing or transporting such liquid gases or other fluids, comprising an inner container and an outer container and an intermediate space, which can be evacuated, between the inner container and the outer container (a so-called double wall container) for vacuum insulation.

In order to remove a fluid at a lowest point from a corresponding inner container, the latter may also be provided with a bulge, as shown, for example, in U.S. Pat. No. 5,165,246 A. A line can be connected at a lowest point of such a bulge.

U.S. Pat. No. 3,122,000 A discloses a system comprising an outer container and an inner container, wherein an intermediate space is filled with insulating material. An upper portion of the inner container has an aperture with a flange, a sealing ring, and a cover.

DE 592 298 C shows an insert container which is enclosed by a pressure vessel, forming a narrow intermediate space. An auxiliary vessel is arranged below the pressure vessel. Both vessels are enclosed by a housing. A pipe socket leads into the auxiliary vessel at the bottom of the insert container.

GB 412 814 A shows a system comprising a first spherical container. A second spherical container is arranged on the first container such that it partially protrudes into the first container. The containers are surrounded by an insulating layer and connected via lines.

Usually, a plurality of lines or pipelines are provided for removing and filling a fluid, depending upon the number of respective consumers or filling devices, wherein the lines are led out of the inner container through the intermediate space and out of the outer container. For this purpose, a connecting piece is provided for each of these lines, via which the respective line is connected to the inner container. For each connecting piece, a hole is cut or drilled into the casing or the bottom of the inner container, and a welding edge preparation is carried out.

However, such individual connecting pieces for each line are cost-intensive and elaborate to produce, since the connecting pieces have to be dimensioned in accordance with predetermined calculation rules and have defined distances between one another. An improvement of cryogenic vessels is therefore desirable, in particular, in order to be able to connect the inner container of a cryogenic vessel to a plurality of lines in a structurally simple manner.

DISCLOSURE OF THE INVENTION

According to the invention, a cryogenic vessel, a fluid distribution container for such a cryogenic vessel, and a method for producing a corresponding cryogenic vessel having the features of the independent claims are provided. Advantageous embodiments of the present invention are the subject matter of the dependent claims and the following description. Advantages and embodiments of the cryogenic vessel according to the invention, and of the fluid distribution container according to the invention and of the associated method, result from the following description in an analogous manner.

The cryogenic vessel is designed as a double wall container and thus has an inner container and an outer container and an intermediate space, which can be evacuated, between the inner container and the outer container for vacuum insulation. An insulating material having low thermal conductivity, e.g., perlite, can be arranged in the intermediate space. In particular, the cryogenic vessel is provided for transporting or for storing a cryogenic fluid or cryogen.

The cryogenic vessel has at least one fluid distribution container according to the invention, which has an internal volume extending from a wall of the inner container into the intermediate space, which can be evacuated, and being arranged at least partially in the intermediate space which can be evacuated, and being in fluid connection with the inner container.

An extension of the internal volume of the fluid distribution container into the arrangement of this internal volume in the intermediate space which can be evacuated shall, in particular, be understood to mean that the fluid distribution container forms a bulge originating from the wall of the inner container into the intermediate space otherwise used for vacuum insulation. The internal volume of the fluid distribution container is not in fluid contact with the intermediate space.

The inner container, on the one hand, and the fluid distribution container, on the other, have at least a two-piece design and are connected to one another, i.e., the inner container and the fluid distribution container are each designed as separate components, which are connected to one another in an expedient manner, for example, integrally. In this case, the inner container and the fluid distribution container itself can each be embodied in one piece or also in several pieces. In particular, the inner container and the fluid distribution container are individual components or individual parts which can be individually manufactured separately from one another. The inner container and the fluid distribution container are, expediently, connected to one another only after these two individual parts have been completely manufactured.

The internal volume of the fluid distribution container is delimited by a wall in which several openings are formed, which are configured to connect at least one line or pipeline, respectively, or are each connected to such a line. The several openings in the wall of the fluid distribution container can, in particular, be configured to connect to corresponding lines in such a way that they have a flange or a differently designed coupling structure, for example, a screw thread or the like. In particular, however, there is a fixed connection to the openings, for example, in the form of a welded joint.

The fluid distribution container or its wall is, expediently, made of the same material as the inner container and/or the outer container, for example, of stainless steel, austenitic steel, and/or carbon steel. The openings in the wall of the fluid distribution container are defined, in particular, by connecting pieces to which corresponding lines are attached. The connecting pieces can, in particular, be formed integrally with the wall of the fluid distribution container. The fluid distribution container has at least two such openings. The openings can each have the same diameter or, in particular, also different diameters, so that, in particular, different lines with different diameters can be connected.

In the context of the present invention, the fluid distribution container or its wall has a convex or curved section. Such a convex shape enables the best possible properties to be achieved, in particular, for pressurizing the fluid distribution container, in particular, with a small wall thickness and high stability. The fluid distribution container can thus be constructed, in particular, in a space- and material-saving and stable manner.

According to the invention, a wall thickness of the wall of the fluid distribution container, in particular, in the convex section, is, at least at one point, smaller than the wall thickness of the inner container in regions in which no fluid distribution container is located. According to the invention, the aforementioned lower wall thickness, present at least at one location of the wall of the fluid distribution container, is less than 90%, in particular, less than 80%, less than 70% or less than 60%, and, in particular, at the same time, more than 10%, more than 20%, more than 30%, more than 40%, or more than 50%, of the wall thickness of the inner container.

In cases in which different wall thicknesses of the inner container are used, which may be advantageous, for example, for manufacturing reasons and/or for adaptation to the respectively acting forces, the stated values for the aforementioned smaller wall thickness, present at least at one location of the wall of the fluid distribution container, relate, in particular, to a mean or to a smallest wall thickness of the inner container outside of regions in which a fluid distribution container is located. The "mean wall thickness" may represent a weighted average or an arithmetic mean, with a weighting for determining the mean value taking place over the respective wall surface portions with specific wall thicknesses. However, it can also be an unweighted average. The wall thickness of the regions in which a fluid distribution container is located can also be, in particular, the wall thickness in the region which surrounds the attachment location of a corresponding fluid distribution container and thus directly adjoins the same.

Needless to say, the wall of the convex section is interrupted in the region of the openings. The above explanations regarding the lower wall thickness present at least at one location of the wall of the fluid distribution container therefore relate to a region outside of the respective openings and possibly existing connecting pieces which surround the openings. There is no wall in the area of the openings which could have a wall thickness, and connecting pieces can locally result in a larger wall thickness.

Due to the small wall thickness present at least at one location of the wall of the fluid distribution container, the manufacture of a corresponding cryogenic vessel can be made significantly more material-saving. Because only thinner material has to be processed to form the openings, the formation of corresponding openings is technically much simpler. In regions in which no openings are arranged and, for example, a material transition to the wall of the inner container is to be provided, a larger wall thickness can be used. In such an embodiment, the wall thicknesses thus advantageously differ at different locations of the wall of the fluid distribution container, or the at least one fluid distribution container can have a greater wall thickness in a region in which it is connected to the inner container than in another region. Further details are explained below.

The convex section is, in particular, dome-shaped and has an apex. In particular, the apex may represent the point at the greatest distance from a wall of the inner container. The apex can, in particular, lie on an axis which is perpendicular to a central axis of the inner container. This axis is furthermore, in particular, perpendicular to a plane in which the largest cross-sectional area of the convex section is located. The convex section can, in particular, be designed to be radially symmetrical, wherein an axis of symmetry defining the radial symmetry extends through the apex and can, in particular, represent that aforementioned axis which is perpendicular to the central axis of the inner container and/or is perpendicular to the plane in which the largest cross-sectional area of the convex section lies.

A corresponding axis, i.e., the axis of symmetry defining the radial symmetry and/or the axis which is perpendicular to the central axis of the inner container, and/or the axis which is perpendicular to the plane in which the largest cross-sectional area of the convex section lies (wherein these axes can also coincide in the explained manner) can each pass through the apex of the convex section. If, in the context of the following explanations, reference is therefore made to an "axis which runs through the apex of the convex section," this is to be understood as meaning an axis of this type. It should be understood that an "axis" as used herein represents a geometric axis and not, or not necessarily, an axis formed from a material. If an opening is optionally provided at the apex, this axis runs, in particular, through the center point of this opening.

If a "radial symmetry of the convex section" is mentioned above, the openings, in particular, in the wall of the fluid distribution container, which can also be arranged in the convex section, can be excluded from the radial symmetry. The identification of the convex section as being radially symmetrical here therefore optionally refers only to the wall of the convex section, but not necessarily to the openings possibly formed therein.

In the context of the present invention, the center point of at least one of the aforementioned several openings in the wall of the fluid distribution container is arranged in the convex section at a position deviating from a position of the apex. In particular, in the case of two or more openings, the centers of two or more than two openings are arranged in this way. In contrast to U.S. Pat. No. 5,165,246 A mentioned at the outset, within the scope of the present invention, one or more openings are thus present which is not or are not arranged at a lowest point of a bulge in an inner container. The measures proposed according to the invention relate less to the possibility of residual removal by the provision of an opening at the lowest point, and instead, primarily, to simplified production in the event that several lines are to be connected to a corresponding container. Nevertheless, a further opening can also be formed at the lowest point or at the apex, for example, for attaching a measuring line.

In one embodiment of the present invention, the center point of at least one of the aforementioned several openings is arranged between two planes which are perpendicular to the aforementioned axis through the apex and, in particular, intersect the wall of the fluid distribution container in the convex section. However, the planes may also intersect a cylindrical section, if any are present. In this way, the two planes define an upper and a lower boundary, between which the at least one opening can be arranged.

In a specific embodiment of the present invention, the center point of at least one of the aforementioned several openings is arranged on a line corresponding to an intersecting line between a sectional plane and the wall of the fluid distribution container in the convex section, wherein the sectional plane is perpendicular to the axis through the apex and intersects the wall of the fluid distribution container, in particular, in the convex section. The intersecting line is thus, in particular, embodied so as to be radially symmetrical with respect to the axis.

If reference is made here to center points of openings in the wall of the fluid distribution container, this is to be understood to mean, in particular, the center points of the transitions between the fluid distribution container and the connected lines or of corresponding flanges. The central axes of corresponding lines or flanges or connecting pieces can also run through these center points.

The convex section is, advantageously, designed in the form of a spherical segment and, in particular, is hemispherical or dome-shaped, or in the form of a spherical hood or spherical cap. Via its corresponding open end or its open cross-section, this spherical segment-shaped section is, expediently, fluidically connected to the inner container via its opening. The spherical segment-shaped section may be welded to the inner container via this open cross-section. The openings in the wall of the fluid distribution container for the connection of the lines or their center points can be arranged along the circumference of this spherical segment-shaped section in the manner explained, i.e., for example, on the line which corresponds to the intersecting line between the sectional plane and the wall of the fluid distribution container in the convex section. As explained below, the convex section may also include a dished shape.

In the case of a hemispherical shape, a minimum wall thickness, in particular, can be achieved at the highest possible stability with pressurization. On the other hand, if the convex section is dome-shaped, it can be arranged in the intermediate region in a more space-saving manner and has a lower space requirement than a hemispherical section. However, it requires a slightly thicker wall thickness for stability during pressurization. The same also applies to a dished shape, as explained below. In all cases, however, the convex section can be formed, at least at one location, with a wall having a smaller wall thickness than the inner container.

The fluid distribution container defines a fluid volume fluidically connected to the inner container, via which fluid volume a plurality of lines can be simultaneously connected to the inner container. In order to bring the fluid distribution container into fluid connection with the inner container, advantageously, only one bore has to be created in the inner container, i.e., the material with the greater wall thickness has to be processed in this way. Thus, since the fluid distribution container has a plurality of openings and is thus provided for connecting a plurality of lines, only one bore is necessary in the inner container in order to connect the inner container to a plurality of different lines. For the connection of the individual lines, only the material with the lower material thickness has to be processed.

In contrast, in a conventional cryogenic vessel, as mentioned, corresponding inner containers are usually formed in one piece, and for each line to be connected to the inner container, a separate hole is drilled into the casing of the corresponding inner container. Conventionally, inner containers thus have a multiplicity of different bores at a wide variety of locations, to each of which a line is connected. By contrast, the present invention makes it possible to dispense with connecting the inner container directly to corresponding lines. Rather, at least some lines may be connected to the inner container via one or more fluid distribution containers. This of course does not rule out that other lines can also be connected directly to the inner container if required.

By contrast, the present invention advantageously provides a fluid distribution container as a separate component, by means of which a plurality of different lines can be connected to the inner container, and, expediently, only one bore is required for these different lines. Thus, several lines can be simultaneously connected to each bore in the inner container via the corresponding fluid distribution container connected to this bore. This considerably reduces the design and manufacturing outlay for the cryogenic vessel, since a plurality of different bores do not have to be produced at different locations in the inner container, but, instead, several lines can be connected simultaneously to the inner container at a single bore. Thus, it is not necessary to provide a separate, single connecting piece for each line and connect it to the inner container. Only the fluid distribution container is connected to the inner container. A central arrangement of several lines and a cost-effective and economical possibility for connecting several lines to the inner container are thus made possible. In comparison with conventional cryogenic vessels, material savings, a reduction in the manufacturing outlay, and thus a cost savings can thus be achieved. A particular advantage results from the use of a smaller wall thickness for the fluid distribution container, as explained above.

The two-piece design of the inner container and of the fluid distribution container implemented according to a particularly preferred embodiment of the invention makes it possible to produce the cryogenic vessel or its inner and outer containers, on the one hand, and the fluid distribution container or containers, on the other, independently of one another, and to produce them with, in particular, different wall thicknesses. Appropriate fluid distribution containers can, expediently, be provided for the production of a cryogenic vessel and connected to the inner container in the course of the production process. It is also possible to retrofit cryogenic vessels in a structurally simple manner.

Advantageously, one or more of the openings are each connected to a line leading out of the outer container, for example, by means of a flange. Such lines are provided, in particular, for removing a fluid stored in the inner container and/or for filling the inner container with a fluid. The lines can be connected to, for example, a valve, in particular, a safety valve. As a result of the fluid connection to the inner container, the fluid distributor fills with a portion of the fluid in the inner container, and this can, for example, be removed therefrom by means of the line(s) connected via the openings in the wall of the fluid distribution container. For example, when filling via the connected line(s), the fluid first flows into the fluid distribution container and, from there, via the fluid connection or the opening in the wall of the inner container into the inner container. The line can be designed as a measuring line in which sensors are, expediently, arranged, for example, in order to measure a pressure, a temperature, etc., of the fluid in the cryogenic vessel.

According to the invention, the internal volume of the at least one fluid container, proceeding from an opening in the wall of the inner container, extends into the intermediate space. The at least one fluid container is preferably connected to the inner container at the edge of this opening, for example, welded thereto. The internal space is fluidically connected with the inner container via this opening.

An opening of the inner container to the fluid distribution container advantageously corresponds in diameter to a diameter of the fluid distribution container. In other words, in such an embodiment, the inner container transitions into the fluid distribution container, without a narrowing or constriction being provided at the transition point. In this way, dead spaces, in particular, which could form in a calm region with respect to flow behind a corresponding constriction, can be avoided. This can prevent typical negative effects such as de-mixing or gas accumulation from occurring for such dead spaces.

However, in another advantageous embodiment, the opening of the inner container to the fluid distribution container may also have a diameter which is less than the adjacent diameter of the fluid distribution container. In other words, in this embodiment, a cross-sectional reduction or constriction can be provided at the connection or transition point between the inner container and the fluid distribution container. This can be embodied, in particular, in the form of a collar or web which surrounds the opening and extends radially inwardly. The collar or web can be formed integrally with the inner container or the fluid distribution container, or be provided in addition. Such a taper of the diameter makes it possible, for example, to ensure that the fluid distribution container always remains filled with liquid, even if the liquid level in the inner container is subjected to movements, for example, during transport. In other words, this can ensure that the fluid distribution container remains filled with liquid even in the case of sloshing movements of the liquid in the inner container during transport.

As mentioned, the at least one fluid distribution container is, advantageously, welded to the inner container or to the opening in its wall. A gas-tight connection between the fluid distribution container and the inner container can thus, expediently, be achieved. In particular, it is thus not necessary in each case to cut or drill a separate hole in the casing or the bottom of the inner container for each line, and to carry out a welding edge preparation in each case. For the plurality of lines connected to the fluid distribution container, expediently, only one hole in the casing or bottom of the inner container and one welding edge preparation are required.

The at least one fluid distribution container is preferably arranged completely in the intermediate space, which can be evacuated, between the inner container and the outer container. The fluid distribution container is thus arranged in a space-saving manner in the cryogenic vessel.

In a particularly advantageous embodiment of the present invention, the at least one fluid distribution container is connected to the inner container at the convex section, i.e., the convex section directly adjoins the inner container. It may be welded to the inner container via the convex section. In a particularly advantageous manner, the fluid distribution container can thus be designed as, for example, a hemispherical or dome-shaped separate component which can be connected via its open cross-section to the inner container, in particular, welded to the inner container. Since the wall of the fluid distribution container has a smaller wall thickness than the inner container at least at one point, an annular connection region of the fluid distribution container can advantageously be designed with a greater wall thickness, or a wall thickness that corresponds to the wall thickness of the inner container for connecting the fluid distribution container to the inner container.

In another embodiment, the at least one fluid distribution container has a cylindrical section connected to the convex section. For the reasons explained, this section can likewise be designed, at least in the connection region, with a wall thickness which is greater than the convex region. However, it can also have the aforementioned lower wall thickness in sections, in order to enable an advantageous attachment of lines there. The fluid connection of the fluid distribution container to the inner container is, expediently, established via this cylindrical section. Preferably, the cylindrical section is welded to the inner container.

The cylindrical section can, expediently, directly adjoin the convex section in the process. The cylindrical section and the convex section can be embodied in one piece, or the cylindrical section can, expediently, be connected to the convex section, for example, via a welded connection. In particular, however, there can also be further, expediently-shaped sections between the convex section and the cylindrical section.

Advantageously, a brim section having a corner radius $r_2$ adjoins the, in particular dome-shaped, convex section having an arc radius $r_1$, where $r_1 > r_2$, which brim section the cylindrical section adjoins. Dimensions, in particular, wall thicknesses and radii of curvature, can be selected in accordance with standards or other specifications, e.g., according to the standard DIN EN 13445-3:2016-12 ("Unfired pressure vessels—Part 3: Design"), according to the standard DIN EN 12285-1:2003-07 ("Workshop fabricated steel tanks—Part 1: Horizontal cylindrical single skin and double skin tanks for the underground storage of flammable and non-flammable water polluting liquids"), or according to the standard DIN EN 12285-2:2005-05 ("Workshop fabricated steel tanks—Part 2: Horizontal cylindrical single skin and double skin tanks for the above-ground storage of flammable and non-flammable water polluting liquids").

In particular, the fluid distribution container can have a section which is formed as a so-called dished bottom or basket arch bottom, or has a dished shape. Dimensions of this section shaped as a dished bottom or basket arch bottom, e.g., the outer bottom diameter, inner bottom diameter, arc radius, corner radius, cylindrical rim height, arc height, total floor height inside, and/or wall thickness, can be selected, for example, in accordance with the DIN 28013:2012-06 ("Convex bottoms—ellipsoidal heads") or DIN 28011: 2012-06 ("Convex bottoms—ellipsoidal heads") standards.

The cryogenic vessel advantageously has two fluid distribution containers. A first fluid distribution container thereof is preferably arranged at a first end of the inner container, in particular, at an upper or a front end. A second fluid distribution container is preferably arranged at a second end of the inner container opposite the first end, in particular, at a lower or rear end. The first fluid distribution container can be provided, in particular, for lines for filling and/or for fluid removal from above in the case of a cryogenic vessel mounted vertically, or from the front in the case of a cryogenic vessel mounted horizontally. The second fluid distribution container can be provided, in particular, for lines for filling and/or for fluid removal from below in the case of a cryogenic vessel mounted vertically, or from behind in the case of a cryogenic vessel mounted horizontally.

In this embodiment, the cryogenic vessel or its inner container can, in particular, have a cylindrical section, wherein a convex section, e.g., a spherical segment-shaped or a dish-shaped section, adjoins at least one end (the aforementioned first and/or second ends) of the cylindrical section. The at least one convex section of the cryogenic vessel or its inner container has a central opening to which a fluid distribution container of the type explained above, and in the manner explained above, is attached. The axis through the apex of the convex section of the fluid distribution container corresponds, in particular, to a longitudinal axis of the cylindrical section of the inner container.

The wall of the fluid distribution container preferably has three openings, and, further preferably, four openings for the connection of a respective line. In the context of the arrangement explained above, these openings or connecting pieces can, in particular, be arranged to be at least partially equidistant with respect to one another. Their center points can thus be arranged, for example, equidistantly on the common line which corresponds to the intersection line between the sectional plane and the wall of the fluid distribution container in the convex section. For example, in each case, two adjacent openings can form an angle between 30° and 90°, in particular, an angle between 45° and 60°, and, in particular, an angle of 50°, or at least essentially 50°, wherein the aforementioned angles lie in the aforementioned sectional plane. An "at least partially" equidistant arrangement is present, in particular, when three or more of the openings are arranged alternately at the same distance from one another, but, at a different location, a larger distance is provided. This results, for example, from an equidistant grouping of corresponding openings on one side.

The cryogenic vessel is preferably designed as a pressure vessel and is configured to store the fluid at a pressure of up to 40 bar. The cryogenic pressure vessel is, expediently, designed for storing liquid gases, e.g., liquid nitrogen (LIN), liquid argon (LAR), liquid oxygen (LOX), liquid carbon dioxide ($LCO_2$), liquid hydrogen ($LH_2$), liquid natural gas (LNG), or liquid laughing gas ($LN_2O$).

The method proposed according to the invention is characterized, in particular, in that, first, an inner container with one or more openings for the connection of one or a respective fluid distribution container is provided, and that one or a respective fluid distribution container is then attached to the one or more openings, wherein the inner container is processed before the connection of the one or respective fluid distribution container, in particular, by cold working, in order to improve its mechanical properties, in particular, in order to, in this way, increase the strength of the inner container. As a result of the subsequent attachment of the fluid distribution container or containers, the production and, in particular, the processing by cold working can be improved, nor do several line openings, with a high manufacturing outlay, need to be formed in a correspondingly produced and, optionally, hardened container.

Further advantages and embodiments of the invention arise from the description and the accompanying drawing.

It is to be understood that the features mentioned above and below may be used not only in the particular combination specified, but also in other combinations or by themselves, without departing from the scope of the present invention.

The invention is schematically represented in the drawing based on an exemplary embodiment, and is described below with reference to the drawing.

DESCRIPTION OF THE FIGURES

In FIG. 1, a preferred embodiment of a fluid distribution container according to the invention is schematically illustrated, and denoted by 100. The fluid distribution container 100 is shown in partial FIG. 1a in a schematic front view, and, in partial FIG. 1b, in a schematic and further simplified cross-sectional view along the line or axis A-A shown in partial FIG. 1a. Partial

Figure 1A:
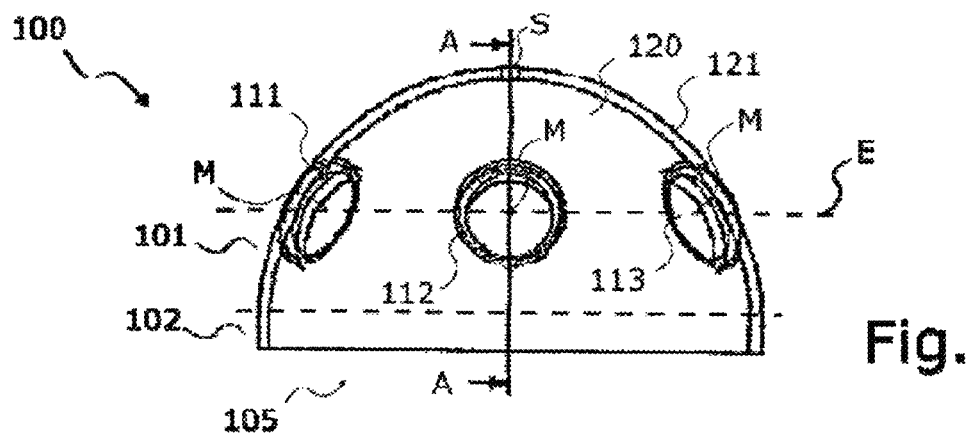
FIG. 1 schematically shows in its partial figures a preferred embodiment of a fluid distribution container according to the invention.
FIG. 1c shows a schematic plan view of the fluid distribution container 100. Identical reference numbers in the figures designate identical or structurally identical elements.

The fluid distribution container 100 has an internal volume 120 delimited by a wall 121. Furthermore, the fluid distribution container 100 has a convex section 101 and a cylindrical section 102 adjoining the convex section 101. The convex section 101 is hemispherical in this example. The following explanations relate to a hemispherically designed convex section 101, but also apply in the same way to a convex section 101 of a different design. The cylindrical section 102 may also be omitted, so that the fluid distribution container 100 may include only the convex section 101.

In the convex section 101, the fluid distribution container 100 has three openings 111, 112, 113 in its wall 121, which, in the example shown, lie on a sectional plane of the hemisphere with a plane E or a corresponding intersection line, wherein the sectional plane is perpendicular to the section axis A-A, and the section axis A-A runs through an apex S of the hemispherical section 101. In this case, the section axis A-A, in particular, also represents an axis of symmetry of the convex section 101, with respect to which the convex section 101, optionally, with the exception of the openings 111, 112, 113, is radially symmetrically designed. The openings 111 and 112, as well as the openings 112 and 113 or axes passing through their center points M in each case form an angle α which equals 50° in the example shown.

Thus, within the scope of the embodiment of the present invention illustrated here, the center points M of the openings 111, 112, 113 in the wall 121 of the fluid distribution container 100 are arranged on a common line corresponding to an intersecting line between a sectional plane E and the wall 121 of the fluid distribution container in the convex section 101, wherein the sectional plane E is perpendicular to the aforementioned axis A-A through the apex S and intersects the wall 121 of the fluid distribution container 100 in the convex section 101. The intersecting line is thus designed, in particular, so as to be radially symmetrical with respect to the axis A-A. However, as mentioned, within the scope of the invention, a different arrangement can also be provided in the convex section 101.

The fluid distribution container 100 is configured to be connected to an inner container of a cryogenic vessel and to be brought into fluidic connection. In particular, for this purpose, an end 105 of the convex section 101 or also of the cylindrical section 102 can be connected to a wall of the inner container, and thus welded to the inner container. The diameter in the cylindrical section 102 is, in particular, constant and, expediently, corresponds to the diameter at the end of the convex section 101.

The openings 111, 112, 113 in the wall 121 are configured, in particular, defined by connecting pieces, to each be connected to a line or pipeline for, for example, removing a fluid stored in the inner container and/or filling the inner container with a fluid.

In particular, the end 105 of the convex section 101 or cylindrical section 102 may be connected to an opening in the wall of the inner container in order to provide a direct fluid connection between the internal volume 120 and the inner container. Alternatively or additionally, a line may also be connected to one of the openings 111, 112, 113, which line is also connected to the inner container, in order to establish an indirect fluid connection between the internal volume 120 and the inner container.

Figure 1B:
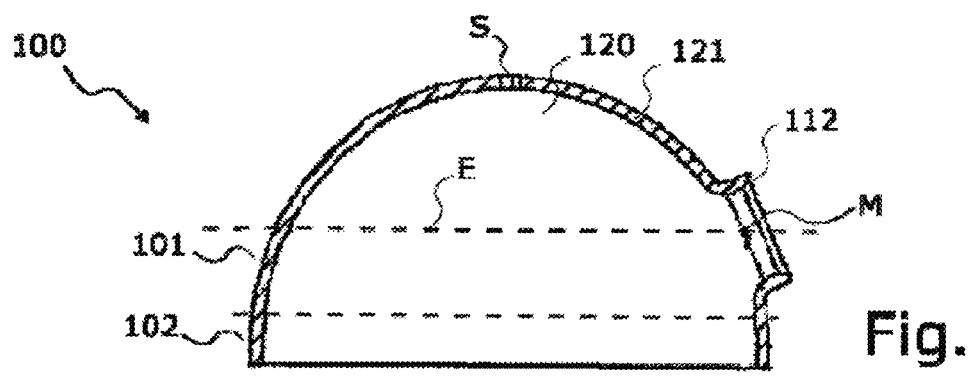
Figure 1C:
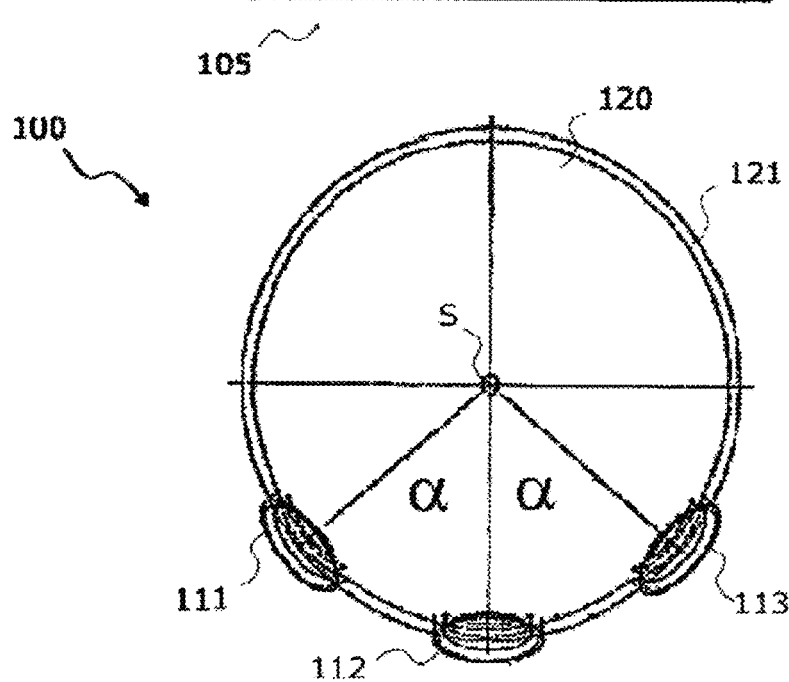
Figure 2A:
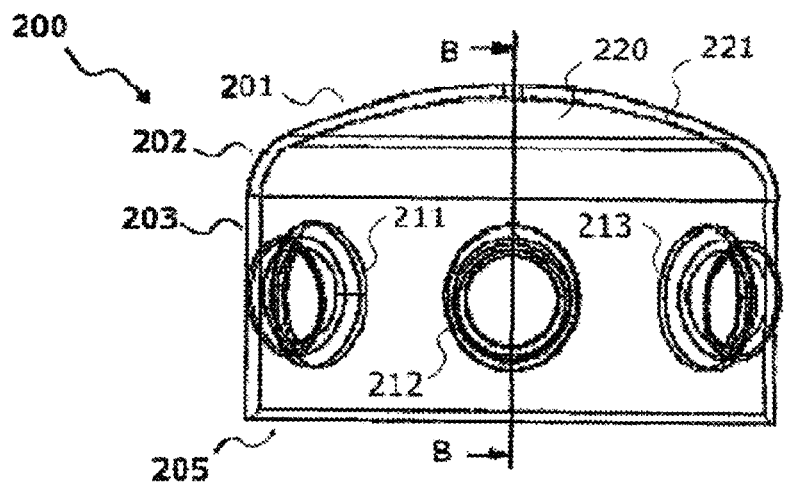
FIG. 2 schematically shows in its partial figures a preferred embodiment of a fluid distribution container according to the invention.
Figure 2B:
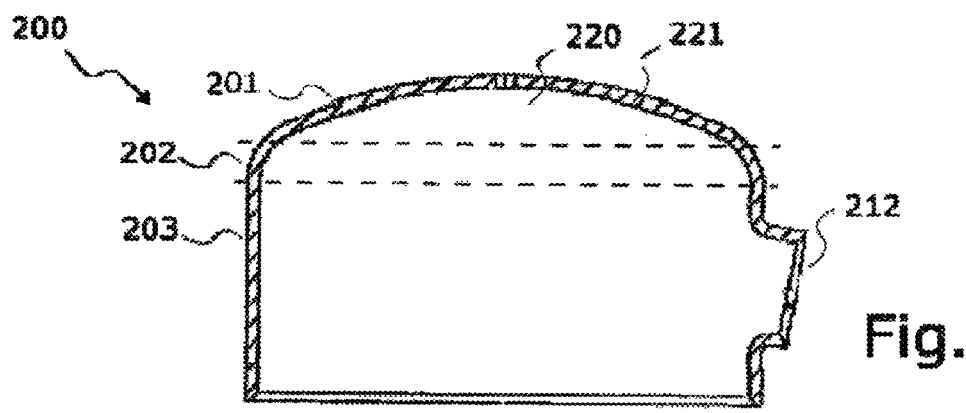
Figure 2C:
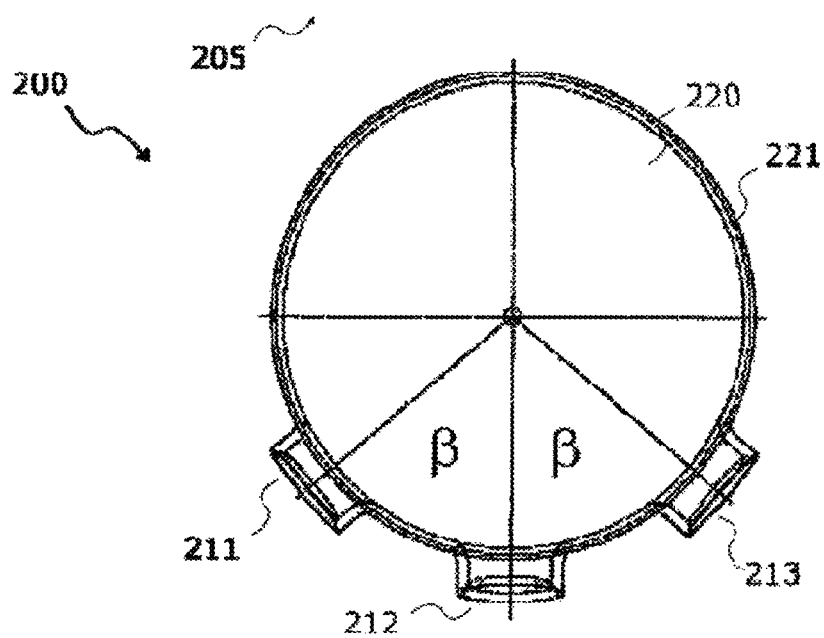

FIG. 2 shows a preferred embodiment of a fluid distribution container 200 according to the invention, analogously to FIG. 1. The fluid distribution container 200 is shown in partial FIG. 2a in a schematic front view, in partial FIG. 2b, in a schematic cross-sectional view along the line B-B shown in FIG. 2a, and, in partial FIG. 2c, in a schematic plan view.

The fluid distribution container 200 has an internal volume 220 delimited by a wall 221 and a convex, dome-shaped section 201, a brim section 202 formed thereon, and a cylindrical section 203 formed thereon.

In the cylindrical section 203, the fluid distribution container 200 has three openings 211, 212, 213 in its wall 221, wherein the openings 211 and 212, as well as the openings 212 and 213, each form an angle β, which is, for example, 50°.

Analogously to the openings 111, 112, 113, the openings 211, 212, 213 are also configured to be connected to a line or pipeline, e.g., for removing a fluid stored in an inner container of a cryogenic vessel, in particular, a pressure vessel which is referred to below, to which, however, the following explanations are not limited, and/or for filling the inner container with the fluid.

The fluid distribution container 200 is further configured to be suitably connected and fluidly connected to such an inner container. In particular, for this purpose, one end 205 of the cylindrical section 203 may be connected to an opening in a wall of the inner container, and thus welded to the inner container. Alternatively or additionally, a line connected to the inner container may be connected to one of the openings 111, 112, 113.

Figure 3A:
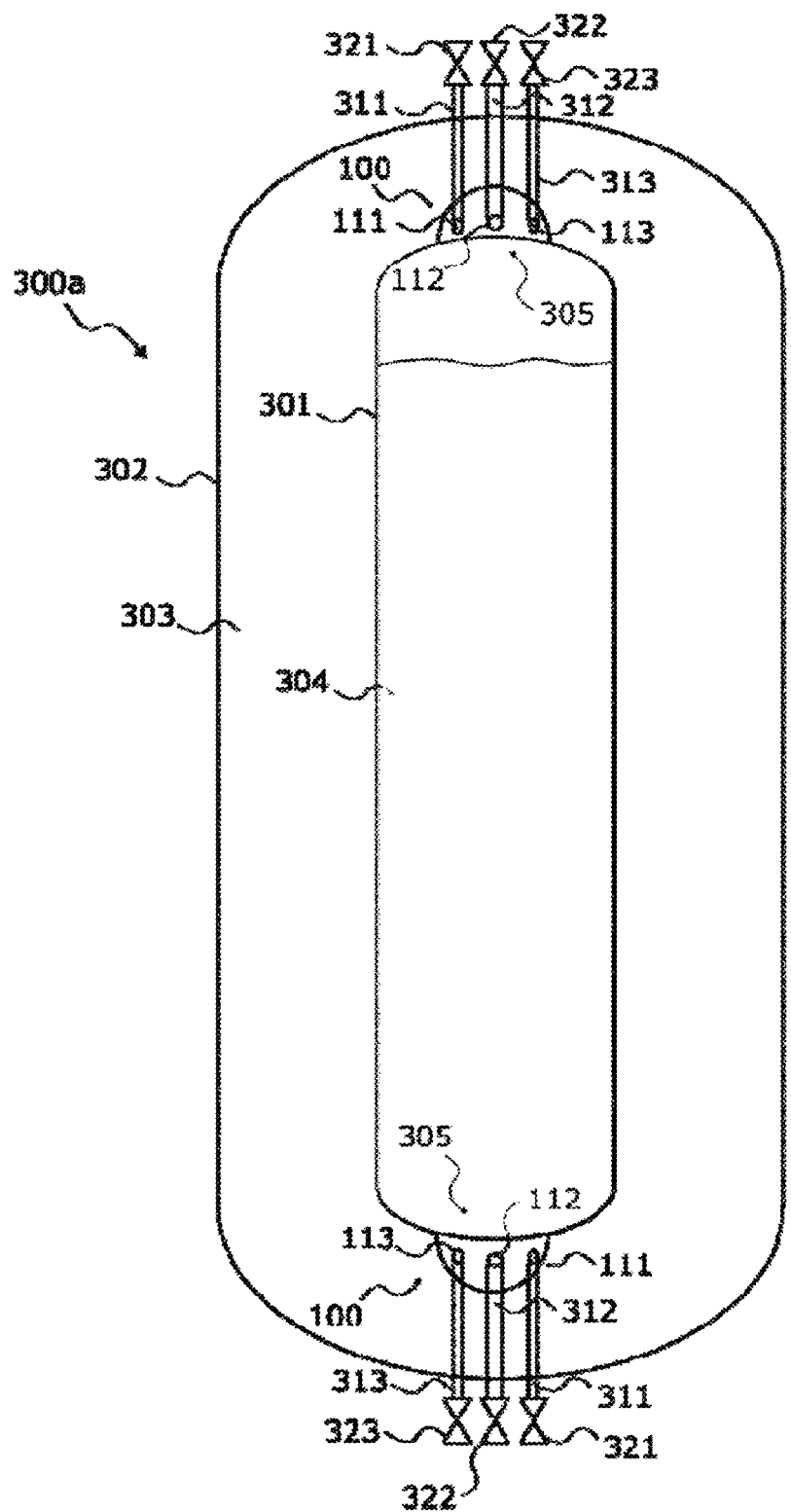
FIG. 3 schematically shows in its partial figures preferred embodiments of cryogenic vessels with preferred embodiments of fluid distribution containers according to the invention.
Figure 3B:
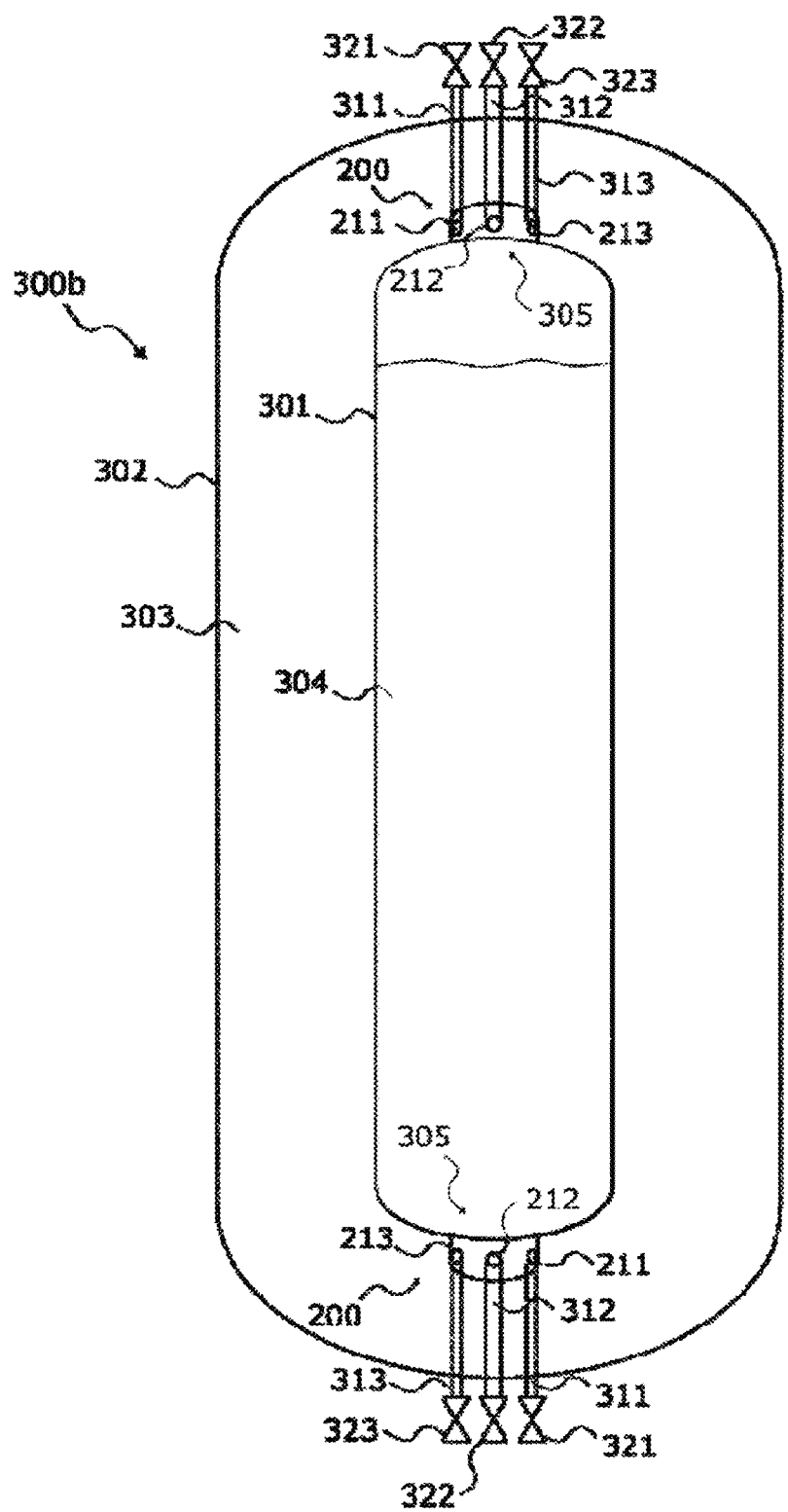

In FIG. 3, preferred embodiments of cryogenic vessels according to the invention are schematically represented in the partial FIGS. 3a and 3b and denoted by 300a and 300b, respectively.

The cryogenic vessels 300a or 300b are each formed as vacuum-insulated, double wall containers, and each include an inner container 301, an outer container 302, and an intermediate space 303, which can be evacuated, between the inner container 301 and the outer container 302. An insulating material with a low thermal conductivity, e.g., perlite, can be arranged in each case in the intermediate space 303.

The cryogenic vessels 300a or 300b are each provided, for example, for storing and transporting liquid gases 304. Liquid gas 304, e.g., liquid nitrogen (LIN), can be stored in the inner container 301 at a pressure of up to 40 bar. For filling the inner container 301 with the liquid gas 304 or for removing the liquid gas 304 from the inner container 301, the cryogenic vessels 300a and 300b each have two preferred embodiments of a fluid distribution container according to the invention.

The cryogenic vessel 300a shown in FIG. 3a has two fluid distribution containers 100, as shown, for example, in FIG. 1. The cryogenic vessel 300b shown in FIG. 3b has two fluid distribution containers 200, as shown, for example, in FIG. 2.

In the present example of FIG. 3a, a first fluid distribution container 100 is arranged at an upper end of the inner container 301, and a second fluid distribution container 100 at a lower end of the inner container 301. The fluid distribution containers 200 are each fluidically connected to the inner container 301. The fluid distribution containers 100, proceeding in each case from an opening 305 in a wall of the inner container 301, extend into the intermediate space 303 and are each arranged completely within the intermediate space 303. For this purpose, the fluid distribution containers 100 are, in particular, welded to the inner container 301, in particular, at the respective end 105 of the cylindrical section 103 or also directly at the end of the convex, hemispherical section 101. The diameters of the openings 305 correspond to the respective diameter of the end 105 of the cylindrical section 102 or of the convex, hemispherical section 101. The wall of the fluid distribution container 100 or its hemispherical section 101 has a smaller wall thickness, at least at one point, than the inner container 301.

Connected to each of the openings 111, 112, 113 of the fluid distribution containers 100 is a line 311, 312, 313 leading out of the outer container 302 in each case through the intermediate space 303. Via these lines 311, 312, 313, the inner container 301 can be filled with the liquid gas 304, or the liquid gas 304 can be removed. A valve 321, 322, 323 is, expediently, provided in each of the lines 311, 312, 313.

Similarly, in the example of FIG. 3b, a first fluid distribution container 200 is arranged at the upper end of the inner container 301, and a second fluid distribution container 200 is arranged at the lower end of the inner container 301, wherein the fluid distribution containers 200 are each fluidically connected to the inner container 301. The fluid distribution containers 200 are also, expediently, welded to the inner container 301, in particular at the respective end 205 of the cylindrical section 203. Expediently, the diameters of the openings 305 correspond to the respective diameter of the end 205 of the cylindrical section 203. With respect to the wall thicknesses, reference is explicitly made to the above explanations.

Lines 311, 312, 313 are also connected to the openings 211, 212, 213 of the fluid distribution containers 200, each of which leads out of the outer container 302 through the intermediate space 303 and is provided for filling the inner container 301 with liquid gas 304 or for removing the liquid gas 304 from the inner container 301.

It goes without saying that, for example, both a fluid distribution container 100 according to FIG. 1 and a fluid distribution container 200 according to FIG. 2 can also be used for the cryogenic vessel. For example, a fluid distribution container 100 according to FIG. 1 may be arranged at the upper end of the inner container 301, and a fluid distribution container 200 according to FIG. 2 at the lower end of the inner container 301, or vice versa.

LIST OF REFERENCE NUMBERS

100 Fluid distribution container
101 Convex section, hemispherical section
102 Cylindrical section
105 End of cylindrical section 102
111 Connecting piece
112 Connecting piece
113 Connecting piece
120 Internal volume of the fluid distribution container 100
121 Wall of fluid distribution container 100
200 Fluid distribution container
201 Convex section, dome-shaped section
202 Brim section
203 Cylindrical section
205 End of cylindrical section 203
211 Connecting piece
212 Connecting piece
213 Connecting piece
220 Internal volume of the fluid distribution container 100
221 Wall of the fluid distribution container 100
300a Cryogenic vessel
300b Cryogenic vessel 301 Inner container
302 Outer container
303 Intermediate space which can be evacuated
305 Opening in the wall of the inner container 301
311 Line
312 Line
313 Line
321 Valve
322 Valve
323 Valve

The invention claimed is:

1. A cryogenic vessel (300a, 300b) comprising:
an inner container (301) having a side wall, a first end wall, and a second end wall, where in the walls of the inner container define an internal space for the storage of fluid,
an outer container (302),
an intermediate space (303), which can be evacuated, between the inner container (301) and the outer container (302), and
a fluid distribution container (100, 200), said fluid distribution container having an internal volume (120, 220) that, proceeding from an edge of a through-hole in the first end wall or the second end wall of the inner container (301), extends into the intermediate space (303), wherein the fluid distribution container is arranged at least partially within the intermediate space (303) and is fluidically connected to the inner container (301) by the through-hole through which fluid in the internal space of the inner container can flow into the fluid distribution container and fluid in fluid distribution container can flow into the internal space of the inner container, wherein the diameter of the fluid distribution container corresponds to the diameter of the through-hole in the first end wall or the second end wall of the inner container, and the fluid distribution container is welded to the edge of the through-hole,
wherein the internal volume (120, 220) of the fluid distribution container is delimited by a further wall (121, 221) which extends from the first end wall or the second end wall and which has a plurality of openings (111, 112, 113, 211, 212, 213) that are each configured for the connection of a line (311, 312, 313) or are each connected to such a line (311, 312, 313), and the further wall (121, 221) has a convex section (101, 201) wherein the convex section (101, 201) is hemispherical (101), and wherein a wall thickness of the further wall (121, 221) at at least one point is less than 90% of a wall thickness of the inner container (301) and more than 10% of said wall thickness of the inner container (301).

2. The cryogenic vessel (300a, 300b) according to claim 1, wherein a center point (M) of one or more of the plurality of openings (111, 112, 113, 211, 212, 213) is arranged at a position deviating from a position of an apex (S) of the convex section (101, 201) of the further wall.

3. The cryogenic vessel (300a, 300b) according to claim 1, wherein a center point (M) of one or more of the plurality of openings (111, 112, 113, 211, 212, 213) is arranged between two planes intersecting the further wall (121, 221) in the convex section (101, 201) thereof and perpendicular to an axis (A-A) through an apex (S) of the convex section, or is arranged on a line which is an intersecting line between a sectional plane (E) and the further wall (121, 221), the sectional plane (E) being perpendicular to an axis (A-A) through the apex (S) of the convex section and intersecting the further wall (121, 221) in the convex section (101, 201).

4. The cryogenic vessel (300a, 300b) according to claim 1, wherein one or more lines (311, 312, 313) leading out of the outer container (302) are each individually connected to one of the plurality of openings (111, 112, 113, 211, 212, 213).

5. The cryogenic vessel (300a, 300b) according to claim 1, wherein the fluid distribution container (100, 200) is arranged completely in the intermediate space (303), which can be evacuated, between the inner container (301) and the outer container (302).

6. The cryogenic vessel (300a) according to claim 1, wherein the fluid distribution container (100) is connected to the inner container (301) at the convex section (101), or the fluid distribution container (100, 200) has a cylindrical section (102, 203) connected to the convex section (101, 201).

7. The cryogenic vessel (300a, 300b) according to claim 6, wherein the further wall of the fluid distribution container (100, 200), in a region connected to the inner container (301), has a wall thickness which is greater than in another region.

8. The cryogenic vessel (300a, 300b) according to claim 1, wherein said vessel has two of said fluid distribution containers (100, 200), wherein a first fluid distribution container (100, 200) is arranged at said first end wall of the inner container (301) and a second fluid distribution container (100, 200) is arranged at the second end wall of the inner container (301), which is opposite the first end wall.

9. The cryogenic vessel (300a, 300b) according to claim 1, wherein the further wall (120, 220) of the fluid distribution container (100, 200) has at least three openings (111, 112, 113, 211, 212, 213) for connecting a respective line (311, 312, 313).

10. The cryogenic vessel according to claim 9, wherein the further wall (120, 220) of the fluid distribution container (100, 200) has four openings for connecting a respective line (311, 312, 313).

11. The cryogenic vessel (300a, 300b) according to claim 1, configured to store the fluid (304) at a pressure of up to 40 bar.

12. The cryogenic vessel (300a, 300b) according to claim 1, wherein said vessel has a plurality of said fluid distribution containers (100, 200).

13. The cryogenic vessel according to claim 1, wherein a wall thickness of the further wall of the fluid distribution container in the convex section is, at least at one point, smaller than the wall thickness of the walls of the inner container in regions in which no fluid distribution container is located.

14. The cryogenic vessel according to claim 1, wherein a wall thickness of the further wall (121, 221) at at least one point is less than 60% of a wall thickness of the wall of the inner container (301) and more than 10% of the wall thickness of the inner container.

15. The cryogenic vessel according to claim 1, wherein the one or more fluid distribution containers has a greater wall thickness in a region thereof which is connected to the inner container than in another region of said one or more fluid distribution containers.

16. The cryogenic vessel (300a, 300b) according to claim 1, wherein said first end wall of said inner container (301) is a first upper end wall, and said second end wall of said inner container (301) is a second lower end wall.

17. A method for producing a cryogenic vessel (300a, 300b) according to claim 1, said method comprising:

providing the inner container (301) with one or more of said through-holes wherein each through-hole is for connection of one or said one or more fluid distribution containers (100, 200), and attaching by welding one or more fluid distribution container (100, 200) to the one or more of said through-holes of said inner container.

18. A cryogenic vessel (300*a*, 300*b*) comprising:

an inner container (301) having a cylindrical side wall and two end walls, wherein one of said end walls is a first end wall and the other of said end walls is a second end wall, an outer container (302), an intermediate space (303), which can be evacuated, between the inner container (301) and the outer container (302), and a fluid distribution container (100, 200) connected to the first end wall of the inner container or the second end wall of the inner container, said fluid distribution container having a container wall (121, 221) which delimits an internal volume (120, 220) that extends from an edge of a through-hole in the first end wall or the second end wall, into the intermediate space (303), wherein the fluid distribution container is arranged at least partially within the intermediate space (303) and is fluidically connected to the inner container (301) by the through-hole through which fluid in the internal space of the inner container can flow into the fluid distribution container and fluid in fluid distribution container can flow into the internal space of the inner container, wherein the diameter of the fluid distribution container corresponds to the diameter of the through-hole in the first end wall or the second end wall of the inner container, and the fluid distribution container is welded to the edge of the through-hole, wherein the container wall (121, 221) of said fluid distribution container has a plurality of openings (111, 112, 113, 211, 212, 213) that are each configured for connection of a line (311, 312, 313) or are each connected to such a line (311, 312, 313), and the container wall (121, 221) of said fluid distribution container has a convex section (101, 201) wherein the convex section (101, 201) is hemispherical (101), and wherein a wall thickness of the container wall (121, 221) at at least one point is less than 90% of a wall thickness of the end wall of the inner container to which the fluid distribution container is connected and more than 10% of the wall thickness of the end wall of the inner container.

19. The cryogenic vessel (300*a*, 300*b*) according to claim 18, wherein said vessel comprises more than one fluid distribution container (100, 200), wherein each fluid distribution container (100, 200) is welded to an edge of a through-hole in either the first end wall of the inner container or the second end wall of the inner container.

* * * * *

UNITED STATES PATENT AND TRADEMARK OFFICE
CERTIFICATE OF CORRECTION

PATENT NO. : 11,549,645 B2
APPLICATION NO. : 16/960652
DATED : January 10, 2023
INVENTOR(S) : Florian Ehegartner It is certified that error appears in the above-identified patent and that said Letters Patent is hereby corrected as shown below:

On the Title Page

Item (73), delete "Munich", and insert --Pullach--.

Signed and Sealed this
Sixth Day of June, 2023

Katherine Kelly Vidal
*Director of the United States Patent and Trademark Office*